United States Patent [19]

Shook et al.

[11] Patent Number: 4,973,253
[45] Date of Patent: Nov. 27, 1990

[54] COLOR SELECTING APPARATUS

[75] Inventors: Lynn H. Shook, Thousand Oaks; Richard Lucir, Topanga; Andrew J. Johnson, Thousand Oaks; Kyle S. Paula, Beverly Hills; Frank S. Nuovo, Encino, all of Calif.

[73] Assignee: Soi Charles W. Perry Design Works, Inc., Newbury Park, Calif.

[21] Appl. No.: 453,697

[22] Filed: Dec. 20, 1989

[51] Int. Cl.$^5$ .............................................. G09B 1/00
[52] U.S. Cl. ..................................... 434/104; 434/101
[58] Field of Search ................. 434/104, 102, 101, 98, 434/96, 404; 40/495; 116/234, 294

[56] References Cited

U.S. PATENT DOCUMENTS

| | | | |
|---|---|---|---|
| 513,399 | 1/1894 | Kreutzer | 434/104 |
| 1,041,765 | 10/1912 | Fors | 434/104 |
| 1,327,005 | 1/1920 | Young | 434/104 |
| 1,779,684 | 10/1930 | Van Sicklen | 40/495 |
| 1,840,208 | 1/1932 | Osborn | 434/104 |
| 2,237,165 | 4/1941 | Scheuer | 434/104 |
| 2,238,316 | 4/1941 | Gaugler | 434/104 |
| 2,512,181 | 6/1950 | Spears | 434/104 |
| 2,521,028 | 9/1950 | Walker | 434/104 |
| 2,748,514 | 6/1956 | Sulger | 40/495 |
| 2,916,833 | 12/1959 | Di Salvo | 434/104 |
| 2,988,824 | 6/1961 | Morton | 434/104 |
| 3,184,864 | 5/1965 | Johnson | 434/104 |
| 4,112,594 | 9/1978 | Impastato | 434/104 |
| 4,199,877 | 4/1980 | Akiyama | 434/104 |
| 4,399,353 | 8/1983 | Adkins et al. | 434/104 X |
| 4,399,353 | 8/1983 | Adkins et al. | 235/78 R |
| 4,400,161 | 8/1983 | Gerlt | 434/104 |
| 4,400,161 | 8/1983 | Gerlt | 434/104 |
| 4,508,344 | 4/1985 | Krogh | 434/404 X |
| 4,801,267 | 1/1989 | Von Loesch et al. | 434/101 X |

Primary Examiner—Richard J. Apley
Assistant Examiner—Rachel M. Healey
Attorney, Agent, or Firm—Jack C. Munro

[57] ABSTRACT

A color indicating apparatus which comprises a plurality of concentric overlappingly arranged discs which are rotatably mounted on a pivot post which is carried by a base. Each disc is basically transparent and includes a plurality of windows with each window being colored to a certain percentage of screening. Each disc is a certain primary color with there normally being utilized four in number of discs with there being four primary colors. Mounted on the base is a locking device which is to be movable to engage with the peripheral edge of the overlapped discs so as to lock the discs when located in a selected position. The visually observable color of each window within the outer disc will assume various shades as determined by the color density of the overlapped windows.

8 Claims, 3 Drawing Sheets

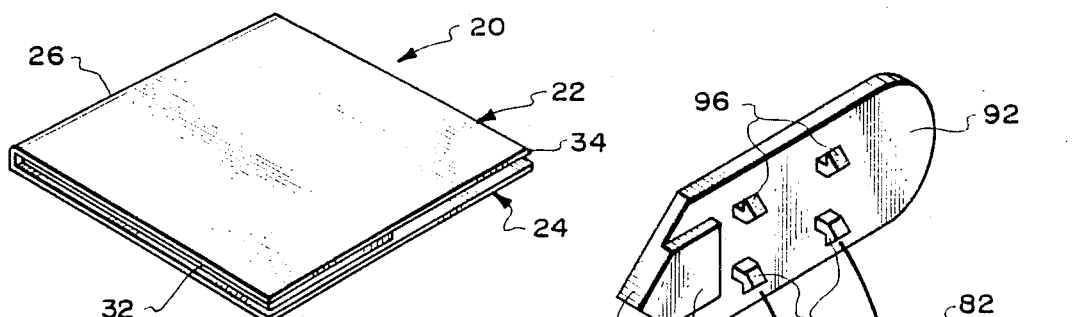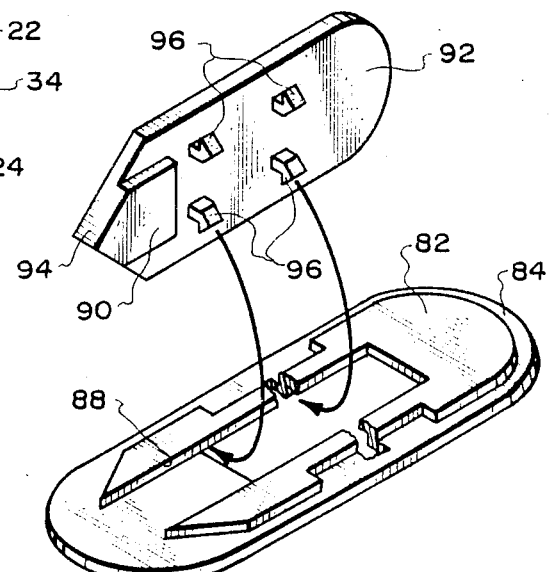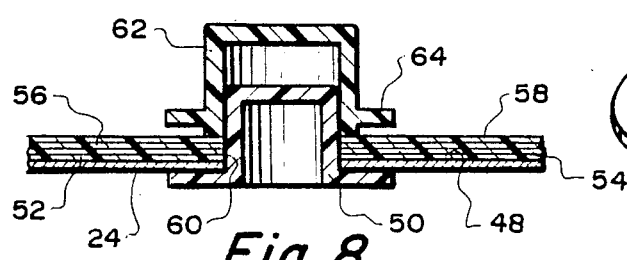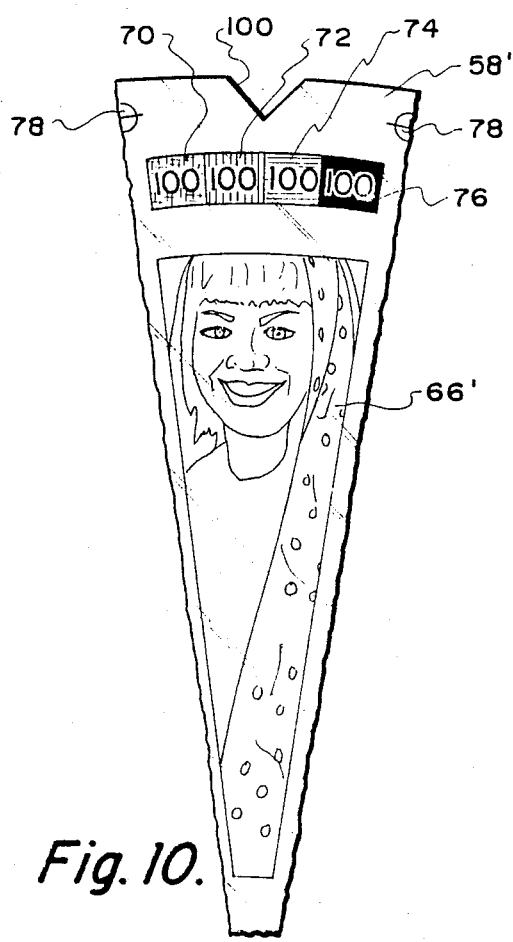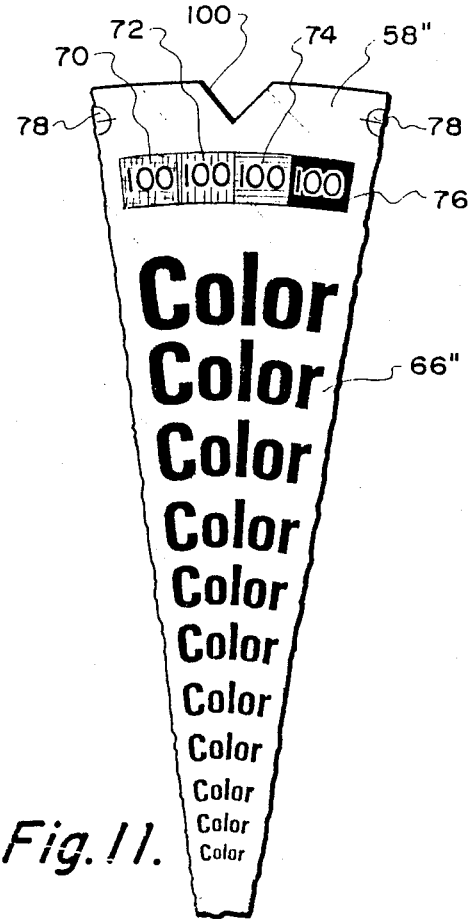

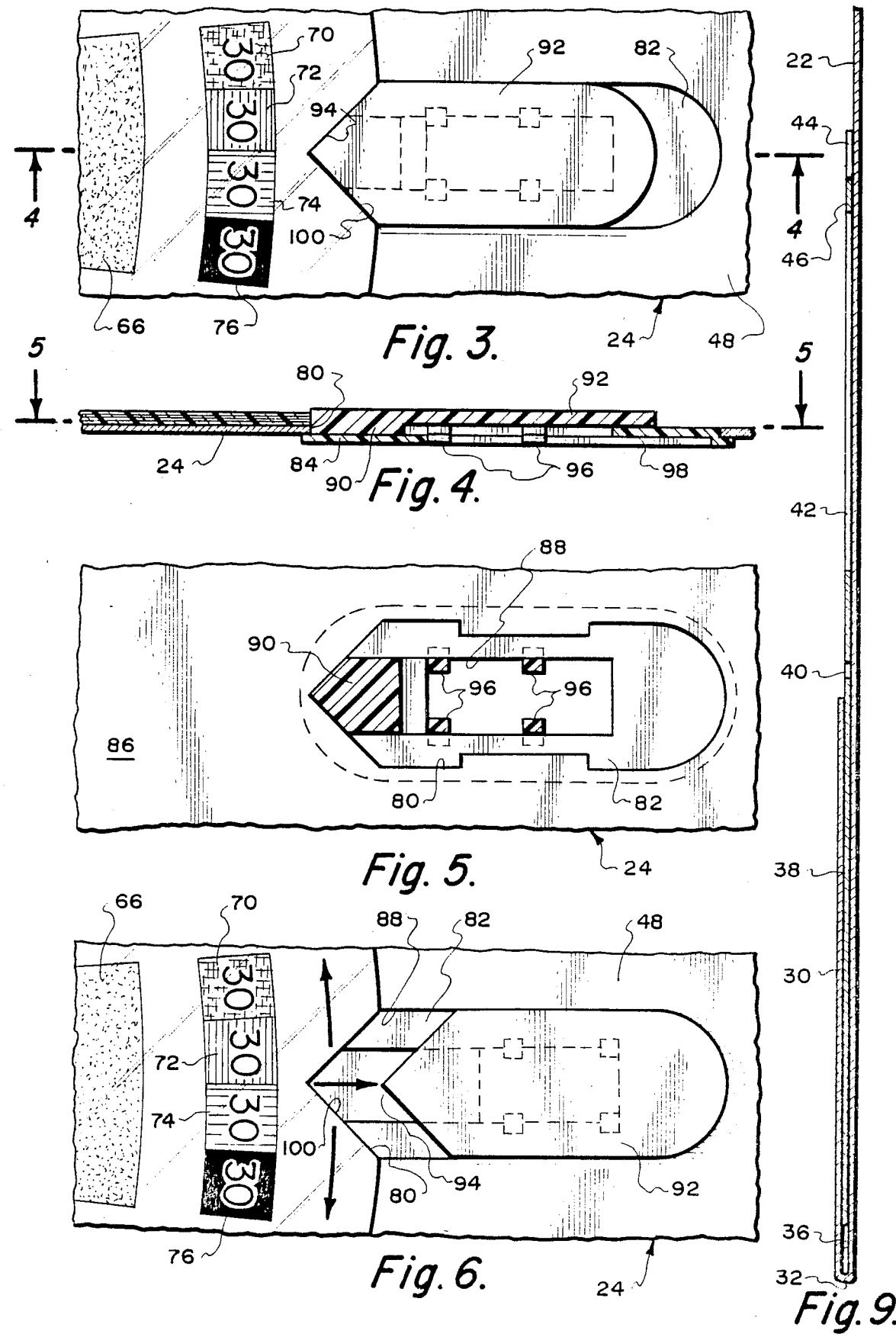

COLOR SELECTING APPARATUS

BACKGROUND OF THE INVENTION

The field of this invention relates generally to an apparatus for selecting and indicating a specific color combined from the four standard primary colors of the four-color printing process which permits combining two or more shades of colors without the necessity of actually mixing liquid quantities of the colors.

Within printing, there is always a need to select colors. Colors are commonly used within printed documents such as advertisements and brochures. The selection of a particular color can be very important to not only make the document look attractive but also to be eye-catching. It is also important that a particular color may be required to blend with one or more other colors.

It is common that upon arriving at a particular color to use a screening wheel or disc. The basic construction of a screening wheel is transparent. Reproduced on the wheel are a plurality of windows with each window being of a particular percentage of screened tint of the particular color for that wheel. It is common for there to be a wheel for each primary color. Locating of the windows of the wheels in an overlapping arrangement visually blends the individual window colors to produce a particular color shade. Changing of the amount of tint in any one wheel, in other words changing of a window, will result in changing of the shade that is produced. Using of these color wheels will result in producing of an actual color without actually producing the colored ink itself. Therefore, a purchaser of printing can select the exact colors that will be produced within the printing operation without producing the actual liquid ink.

In the past, such wheels were not designed to be of the utmost convenience to the user. The wheels could be moved easily relative to each other, generally about a pivot post. However, the different tints that made up the produced color were not immediately perceivable but had to be determined by flipping individually from wheel to wheel. Also, to assist the user, it is normally preferable that the aligned windows of the individual discs are to be precisely overlapped. There has not been known any device usable in conjunction with these prior art wheels to precisely arrange these wheels in an exact overlapping arrangement.

SUMMARY OF THE INVENTION

One of the primary objectives of the present invention is to construct an apparatus which is capable of producing a wide variety of combinations of primary colors to produce a vast number of different shades of color which are to be observable prior to selecting of a shade to be utilized in printing.

Another primary objective of the present invention is to construct an apparatus which provides for a wide variety of different selectable colors each of which are an accurate representation of a color which will be produced in the printing process.

Another objective of the present invention is to include a locking device to lock the colored discs together in a selected position so that the windows of the different discs are in exact alignment which produces the best possible unobstructive view of the shade of color that is produced to thereby eliminate any possible misinterpretation of exactly what color is produced.

Another objective of the present invention is to construct an apparatus which can permit changing of discs or eliminate discs and also permit the adding of additional discs if such is deemed to be desired.

Another objective of the present invention is to include colored discs that include a picture to assist a user in visually observing what a picture would actually look like in the selected shade of color and also discs that include words of various sizes to again assist the user as to what the printed word would look like in that particular color when printed.

The apparatus of the present invention comprises a sheet material base on which is centrally located a pivot post. Pivotally mounted on the pivot post are a plurality of transparent discs. Each disc is divided into a plurality of windows with therebeing the same number of windows on each disc. Each window is formed of a certain percentage of screening in a particular color. There will normally be utilized four in number of discs with each disc being of a standard printing primary color (magenta, cyan, yellow and black). All the discs are of the same size. Within the peripheral edge of each of the discs, there is located a plurality of notches with therebeing a notch for each window. Engageable with an aligned series of notches is a movable locking device which is mounted on the base. When the locking device is so engaged with the notches, the windows of each of the discs are in exact alignment. Associated with each window of each disc is a numerical indicia representative of the amount of screening within that particular window. When the discs are all in exact alignment with each other, the numerical indicia of the different discs of each window are all in juxtaposition and do not overlap one another. There is to be included a series of colored discs with plain colored panels mounted on a base. A second base is to include a second series of discs, again of the normal colors magenta, cyan, yellow and black, but included in each window is a picture. On a third base, there is to include a series of discs which are again of the same colors and included within each window are a plurality of words of different point sizes.

BRIEF DESCRIPTION OF THE DRAWINGS

FIG. 1 is an isometric view of a typical base which is formed into a folder, in the closed position, within which is includes a series of the colored discs of the present invention;

FIG. 3 is an enlarged view of the locking device included within the apparatus of this invention taken along 3—3 of FIG. 2;

FIG. 4 is a cross-sectional view taken along line 4—4 of FIG. 3 showing the locking device in the locked position;

FIG. 5 is a cross-sectional view taken along line 5—5 of FIG. 4 showing more clearly the internal structure of the locking device included within the apparatus of this invention;

FIG. 6 is a view, similar to FIG. 3, but showing the locking device in the unlocked position;

FIG. 7 is an isometric view of the locking device included within the apparatus of this invention showing the two parts of the locking device in an exploded position;

FIG. 8 is a cross-sectional view through the pivot post mounted in conjunction with the folder of FIG. 1 taken along line 8—8 of FIG. 2;

FIG. 9 is a cross-sectional view of the pocket portion of the folder in FIG. 1 taken along line 9—9 of FIG. 2;

FIG. 10 is a front view of a single modified form of a window in which there is included a picture; and FIG. 11 is a view, similar to FIG. 10, where the window includes a series of words of different sizes.

DETAILED DESCRIPTION OF THE SHOWN EMBODIMENT

Figure 2:
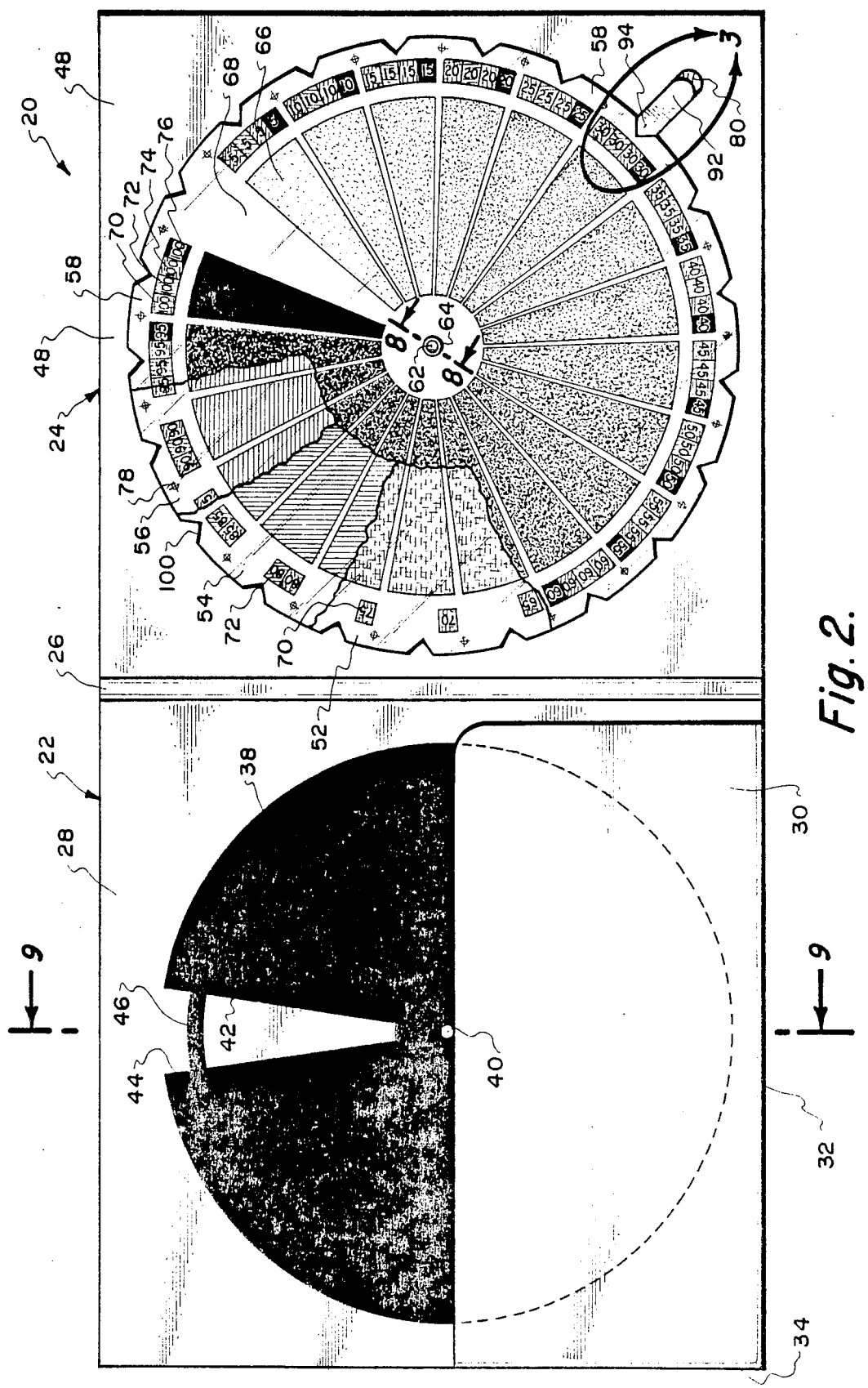
FIG. 2 is an enlarged view directly observing the inside surfaces of the folder of FIG. 1 with the folder being shown in the open position.

Referring particularly to the drawings, there is shown in FIG. 1 a folder 20. Folder 20 is composed of a front flap 22 and a rear flap 24 which are connected together along a spine 26. The flaps 22 and 24 can be located in an open position as shown in FIG. 2 or located in a closed position with flaps 22 and 24 overlapping one another. For purposes of this invention, the rear flap 24 will also be referred to as the base. The flaps 22 and 24 may be constructed of any conventional rigid sheet material such as paper or plastic.

Flap 22 has an inside surface 28 to which is attached a wall 30. Wall 30 is sealed at the bottom edge 32 and at the outer edge 34 with the other edges of the wall 30 being open so as to form a pocket 36. Within the pocket 36 there is to be removably located an opaque disc 38. Opaque disc 38 includes a center hole 40, an enclosed window opening 42 and an edge recess 44. Separating the window opening 42 and the edge recess 44 is an opaque strip 46. The function of the opaque disc 38 will be explained further on in this specification.

Centrally mounted on the rear flap 24 and protruding from the inside surface 48 of the rear flap 24 is a fixed upstanding post 50. The upstanding post 50 will generally be constructed of metal or plastic and will resemble in cross-section a cap. There are a plurality of color discs 52, 54, 56 and 58, all of which are the same size and all of which have a center hole 60 which are of the same size. The upstanding post 50 is to connect with the center holes 60 with each disc 52, 54, 56 and 58 being independently rotatable on the post 50. The outermost end of the post 50 is to be connectable with a cap 62 which is to connect in a snug fitting manner with the post 50. The cap 62 and the post 50 define a pivot post arrangement for the discs 52, 54, 56 and 58. The cap 62 includes an outwardly protruding annular flange 64 that is spaced a short distance from the disc 58. It is the function of the flange 64 to facilitate entry of a thin tool between the flange 64 and the disc 58 so as to provide for manual separating of the cap 62 from the post 50. The reason for this separation is so that one or more of the discs 52, 54, 56 or 58 may be removed so that fewer than four in number of the discs may be mounted on the post 50, or other discs (not shown) could be added onto the post 50, or the colors of discs 52, 54, 56 and 58 could be changed.

Each of the discs 52, 54, 56 and 58 is constructed of a transparent plastic material. Imprinted on each of the discs 52, 54, 56 and 58 are a plurality of wedges which form windows 66. There are in essence twenty-one of the windows 66 with one of the windows 66 comprising the actual material of the disc itself such as is shown by numeral 68 for disc 58 in FIG. 2 of the drawings. The remaining windows 66, twenty in number, are each progressively colored with the same color but varying in density starting at a five percent density and ending with one hundred percent density. Therefore, the increments of density, which is frequently termed "screening" in the printing industry, proceed at five percent, ten percent, fifteen percent, twenty percent, and so forth, until one hundred percent is reached.

Each disc defines a certain color with disc 52 being yellow, disc 54 being magenta, disc 56 being cyan and disc 58 being black. It is by maneuvering the discs 52, 54, 56 and 58 to various positions relative to each other that various densities of windows 66 will overlap. As a result, different shades of an overall produced color will be arrived at and visually observable. In some instances, the disc 58 will not be utilized with only the primary colored discs of magenta, cyan and yellow being utilized. However, by using of the black disc 58, the overall produced color is darkened or made what is frequently termed "deeper".

Associated with each window 66 of the disc 52 is a rectangularly shaped block 70. Each of the blocks 70 are colored the color of the disc. Disc 52 would be yellow. Within each block 70 is located a numerical value. This numerical value corresponds to the percentage of screening for its respective window 66. Therefore, each block 70 will have a number of five to one hundred with therebeing increments of five located between successive numbers.

In a similar manner for disc 54, there is associated a block 72 for each window 66. Blocks 72 also include the same numerical arrangement as previously discussed for blocks 70. There is also a block 74 for each window 66 of the disc 56 with there also being a block 76 for each window 66 of the disc 58.

Each disc 52, 54, 56 and 58 will include a plurality of hairline insignias 78. There is to be a hairline insignia 78 in radial alignment with the gap area between directly adjacent windows 66.

Formed within the bottom flap (or base) 24, is a hole 80. This hole 80 has an irregular configuration which is to matingly connect with an irregularly shaped section 82 of a fixed plate 84. Fixed plate 84 is to abut against and will be adhesively secured to the outside surface 86 of the flap 24. The protruding section 82 defines a centrally located elongated channel 88. Within that channel 88 there is mounted in a close conforming manner a block 90. Block 90 is capable of moving within the channel 88. Block 90 is mounted on a movable member 92. The forward end of the movable member 92 is formed into a sharpened point 94.

Integrally attached to the member 92 and located directly adjacent the block 90 are four in number of deflectable hook members 96. In installing in position the fixed plate 84 within the opening 80, the hook members 96 are connected with the channel 88. Compressing together the members 92 and 84 will result in the hook members 96 deflecting and snapping in position so that the hook members 96 will engage with the undersurface 98 of the protruding section 82. In this manner, the members 92 and 84 are locked together. However, the member 92 is capable of being moved longitudinally relative to the member 84 from the locked position shown in FIG. 3 to the unlocked position shown in FIG. 6.

Formed within the peripheral edge of each of the discs 52, 54, 56 and 58 are a plurality of spaced apart notches 100. Notches 100 are all of the same size. There is to be a notch 100 associated for each window 66 so that in essence there are twenty-one in number of such notches 100 for each disc 52, 54, 56 and 58. During rotation of the discs 52, 54, 56 and 58 in order to select a desired shade of color within an aligned overlapping series of windows 66, the member 92 is located in the position shown in FIG. 6. When a particular desired position is arrived at, to insure that the discs 52, 54, 56 and 58 will remain in this established position, the operator only needs to slide the member 92 to the locked position shown in FIG. 3. The pointed end 94 will engage With an aligned series of the notches 100 of the overlapping discs 52, 54, 56 and 58. If the user desires again to rotate the discs 52, 54, 56 or 58 relative to each other, the operator only needs to move the member 92 to the unlocked position shown in FIG. 6.

It is to be noted that when the pointed end 94 is engaged in aligned series with the notches 100, the blocks 70, 72, 74 and 76 will be located in juxtaposition for each window 66. This arrangement of the blocks 70, 72, 74 and 76 is clearly shown in FIGS. 2, 3 and 6 of the drawings. Therefore, the color of each of the blocks 70, 72, 74 and 76, plus their side-by-side orientation as well as their numerical value contained in each of the blocks 70, 72, 74 or 76, informs to the user exactly what color discs are being utilized. The percentage of screening that is contained within each of the four overlapped windows is denoted by the numerical value contained within each of the blocks 70, 72, 74 and 76.

In order to avoid distraction, a particular user may desire to block out all the windows except the selected window 66. In that instance, the opaque disc 38 is to be mounted on the post 50 on top of the disc 58. The opening 42 is to connect with the particular selected window 66 with the recess 44 exposing the series of blocks 70, 72, 74 and 76 for that particular window. In order to mount the opaque disc 38 on the post 50, just place the center hole 40 of disc 38 in connection with the cap 62. The center hole 40 of opaque disc 38 is larger in size than the other discs. To further assist the user in correct aligning of The discs 52, 54, 56 and 58, the user can precisely overlap the inscribed hairlines 78 on the discs 52, 54, 56 and 58.

Referring particularly to FIGS. 10 and 11, there are shown modified discs 58' and 58" respectively. Within FIGS. 10 and 11, like numerals have been utilized to refer to like parts comparing such to discs 52, 54, 56 and 58. It is to be noted that the window 66 within the discs 52, 54, 56 and 58 are of a continuous color of its prescribed density. However, in FIG. 10, the window 66' is impregnated with a picture which is different from the window 66. In FIG. 11, the windows 66" include a series of words with eleven in number of such words being shown within the window 66". The word shown within FIG. 11 is "color" and it is shown in various sizes. It is to be understood that each of the windows 66' within each disc will include the same picture. It is also to be understood that each of the windows 66" will include the same arrangement of words. Using of the window 66' will assist the user in determining a particular color arrangement if a picture is going to be printed. In a similar vein, using of the windows 66" will assist the user in selecting a color for a "word" and even a color for a "word" of a particular size. It is to be understood that the discs 58' which include windows 66' will be located within their own folder similar to folder 20. The same is true for the discs 58" which embody window 66".

What is claimed is:

1. A color selecting apparatus comprising:
  a base;
  a plurality of discs, each said disc being constructed of a transparent material, said disc being mounted on said base in a concentric overlapping arrangement, each said disc having a center hold, a pivot post mounted on said base, each said center hole connecting with said pivot post, each said disc being rotatable on said pivot post:
  each said disc being divided into a plurality of windows, said windows of each said disc being of a particular primary color, each said disc being of a different primary color, said windows of said disc being arranged sequentially in a series of various contrasts, locating a said window of one said disc upon a said window of another said disc produces a particular shade of color and moving said windows to different overlapping positions produces different shades of color; and
  a locking means for fixing the established position of said discs on said base so said windows of said disc align in their overlapped arrangement, said locking means being mounted on said base, said locking means being movable to an unlocked position, said unlocked position permitting free rotation of said discs relative to said base, each said disc having a peripheral edge, a plurality of notches formed within each said peripheral edge said notches of each said disc being spaced apart, said locking means comprising a fixed member and a movable member, said fixed member being fixed to said base, said movable member being slideably movable on said base toward and away from said peripheral edge, said locking means being positionable in a locking position engaging with a said notch thereby fixing the established position of said disc.

2. The color selecting apparatus as defined in claim 1 wherein:
  said notches within each said disc being evenly spaced apart.

3. The color selecting apparatus as defined in claim 2 wherein:
  there being a single said notch for each said window.

4. The color selecting apparatus as defined in claim 3 wherein:
  each said disc including numerical identifying indicia comprising a plurality of numbers, there being a said number for each said window of each said disc, when said movable member of said locking means engages with an aligned series of said notches of said overlapping discs the said numerical identifying indicia of said discs being arranged in juxtaposition.

5. The color selecting apparatus as defined in claim 4 wherein:
  said numerical identifying indicia also including a color with that color corresponding to the particular primary color of the said disc.

6. The color selecting apparatus as defined in claim 5 wherein:
  each said window including a picture.

7. The color selecting apparatus as defined in claim 5 wherein:
  each said window including a plurality of words, said words within each said window being of different sizes.

8. The color selecting apparatus as defined in claim 7 wherein:
  said words within each said window comprising one word that is repeated.

* * * * *

UNITED STATES PATENT AND TRADEMARK OFFICE
CERTIFICATE OF CORRECTION

PATENT NO. : 4,973,253
DATED : Nov. 27, 1990
INVENTOR(S) : Lynn H. Shook, Richard Lucik, Andrew J. Johnson, Kyle S. Paula and Frank S. Nuovo It is certified that error appears in the above—identified patent and that said Letters Patent is hereby corrected as shown below:

ON TITLE PAGE:

Within bracket section [75] Inventors:, line 2, change "Lucir" to ---Lucik---.

section [73] Assignee:, delete "Soi", change "Perry" to ---Pelly--- and change "Design Works" to ---Designworks---.

Signed and Sealed this

Twenty-third Day of June, 1992

Attest:

DOUGLAS B. COMER

*Attesting Officer*  *Acting Commissioner of Patents and Trademarks*